Sept. 20, 1971 S. KELLER 3,606,489
ANTISLIP DEVICE FOR A COMPRESSED AIR BRAKE
Filed March 10, 1970
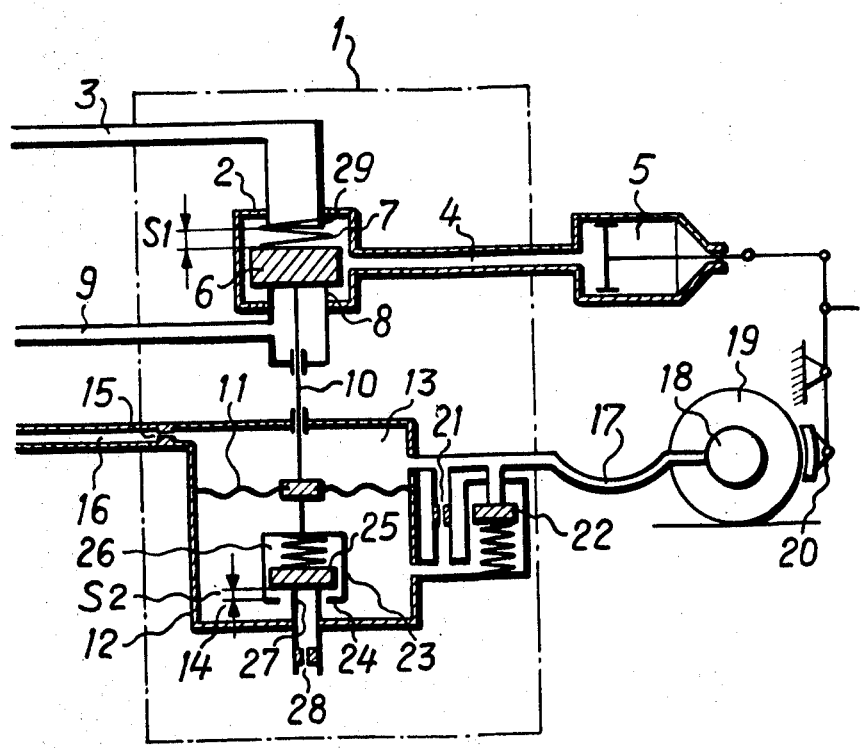
SIEGFRIED KELLER, Inventor
Attorneys United States Patent Office 3,606,489
Patented Sept. 20, 1971

3,606,489
ANTISLIP DEVICE FOR A COMPRESSED
AIR BRAKE
Siegfried Keller, Effretikon, Switzerland, assignor to
Werkzeugmaschinenfabrik Oerlikon-Buhrle AG, Zurich,
Switzerland
Filed Mar. 10, 1970, Ser. No. 18,065
Claims priority, application Switzerland, Mar. 26, 1969,
4,564/69
Int. Cl. B60t 8/12
U.S. Cl. 303—21CG                              4 Claims

ABSTRACT OF THE DISCLOSURE

An antislip device for compressed air brakes with a double-seated valve having a valve member connected to a piston which divides a first chamber communicating with a deceleration detector from a second chamber which is in communication with the first chamber through a throttling constriction, in which the piston is connected to a part of a telescopic valve for exhausting the second chamber, and the length of the stroke of the telescopic valve is less than the length of the stroke of the valve member of the double-seated valve.

---

The invention relates to an antislip device for a compressed air brake, particularly for use with railway vehicles.

A known kind of antislip device comprises a double-seated valve having a valve member connected to a piston which divides a first chamber communicating with a deceleration detector from a second chamber communicating with the first chamber through a constricted passage.

In an antislip device of the above kind, the deceleration detector responds to deceleration of its associated axle by exhausting the first chamber when the deceleration exceeds a given rate. The resultant pressure differential between the two chambers causes the piston to shift and to operate the double-seated valve which then shuts off the connection between the compressed air supply and the brake cylinder and instead connects the cylinder to exhaust.

In order to permit this antislip device to respond again, the different pressures in the two chambers must first be equalised by refilling the first chamber. Equalisation takes a relatively long time to effect and the device may be unable to ensure a reliable changeover of the antislip device from brake-applying to brake-releasing positions when the signal pulses of the deceleration detector repeat themselves at short intervals.

An antislip device according to the invention substantially overcomes this difficulty, and functions reliably even when the signal pulses generated by the deceleration detector are repeated at short intervals.

An antislip device according to the invention comprises, a double-seated valve having a valve member connected to a piston which divides a first chamber communicating with a deceleration detector from a second chamber which is in communication with the first chamber through a throttling constriction, in which the piston is connected to a part of a telescopic valve for exhausting the second chamber, and the length of the stroke of the telescopic valve is less than the length of the stroke of the valve member of the double-seated valve.

An embodiment of an antislip device according to the invention will be hereinafter more particularly described with reference to the drawing. The single figure of the drawing is a schematic illustration of an antislip device according to the invention.

The antislip device 1 is enclosed in a box indicated by a dotdash outline. A double-seated valve 2 communicates through a compressed air pipe 3 with a control valve (not shown) and through a pipe 4 with a brake cylinder 5. The double-seated valve 2 contains a valve member 6 which is biased by a spring 7 so as to contact a seat 8 of the said valve. In this position the pipe 4 to the brake cylinder 5 is connected to the compressed air pipe 2 and cut off from an exhaust pipe 9. Attached to the valve member 6 is a piston rod 10 which is in turn connected to a piston 11. The piston 11 is attached to a flexible diaphragm which divides a cylinder 12 in the antislip device 1 into two chambers 13 and 14. The first chamber 13 communcates through a throttling constriction 15 with an air pipe 16 leading to an auxiliary reservoir. The first chamber 13 also communicates through a pipe 17 with a deceleration detector 18. The deceleration detector 18 is mounted on the axle of a vehicle wheel 19 which can be braked by the application thereto of a brake shoe 20 operated by the brake cylinder 5. The second chamber 14 communicates with the first chamber 13 firstly through a passage containing a constriction 21 and secondly through a check valve 22. The check valve 22 does not open unless the pressure in the first chamber 13 exceeds that in the second chamber 14. The check valve 22 may be adjustable for instance by variation of the biasing force of its spring. For exhausting the second chamber 14 a telescopic valve 23 is provided, which comprises a guide member 24 attached to the piston rod 10. The guide member 24 contains a movable valve element 25 which is biased by a spring 26. A valve seat 27 attached to the cylinder 12 co-operates with the valve element 25. As soon as the valve element 25 lifts off the seat 27, air from the second chamber 14 can escape to atmosphere through a constricted outlet opening 28.

When the pressures in the two chambers 13 and 14 are equal the valve element 25 will be in contact with its valve seat 27, at a distance $s_2$ above an abutment of the guide member 24. At the same time the valve member 6 will be resting on the seat 8 of the double-seated valve 2 at a distance $s_1$ from the other seat 29 of the said valve. This position is illustrated in the drawing. The distance $s_1$ exceeds the distance $s_2$. Thus when the pressure in the first chamber 13 falls, the telescopic valve 23 will open before the valve member 6 makes contact with the upper seat 29 of the double-seated valve 2. The deceleration detector 18 exhausts the first chamber 13 as soon as the deceleration of the axle exceeds a permissable rate at which slip might occur.

The antislip device illustrated functions as follows:

So long as the deceleration detector 18 does not respond the valve member 6 of the double-seated valve 2 will remain in the illustrated position and, for braking, compressed air can enter the brake cylinder 5. When the brake is released air flows from the brake cylinder 5 through the brake pipe 3, the control valve, (not shown), and exhausts to atmosphere.

However, when the deceleration of the axle during the application of the brakes exceeds a rate at which the slipping might occur because of the conditions of the rails, then the deceleration detector 18 will respond and exhaust the first chamber 13 of the antislip relay 1 through the pipe 17 to atmosphere. The pressures in the two chambers 13 and 14 will therefore now differ, since air from the auxiliary reservoir can only slowly enter the first chamber 13 through the constriction 15. A rapid equalisation of pressures between the two chambers 13 and 14 cannot take place because of the constriction 21 and the fact that the check valve 22 remains closed as long as the pressure in the first chamber 13 is less than that in the second chamber 14. Consequently due to the pressure differences in the two chambers the piston 11 will shift upwards so as to lift the valve member 6 from its seat 8 in the double-seated valve 2. Thus air in the brake cylinder 5 will rapidly exhaust to atmosphere through the pipes 4 and 9. Since the valve member 6 now makes contact with the outer seat 29 and no further compressed air is supplied to the brake cylinder 5.

As the distance $s_1$ of travel of the valve member 6 of the double-seated valve 2 exceeds the distance $s_2$ from the abutment of the guide member 24 to the valve element 25 the telescopic valve 23 the valve element 25 will also be lifted off its seat 27 and the second chamber 14 likewise exhausted through the constricted outlet 28. The equalisation of pressure in the chamber 13, 14 now allows the piston 11 to return to its initial position as shown in the drawing. By appropriately selecting the cross sections of the constriction 15 in the pipe 16 from the auxiliary reservoir and of the outlet constriction 28 as well as of the constriction 21 in the passage connecting the chambers 13, 14 the movement of the piston 11 to return to its initial position when the deceleration detector 18 has stopped further exhausting of air to atmosphere from the pipe 17, can be timely controlled, i.e. when the deceleration of the axle has again fallen below the permissable level to avoid slipping.

The check valve 22 which is parallel to the constriction 21 in the pipe joining the chambers 13, 14 prevents a substantially higher pressure than that in the second chamber 14 from building up in the first chamber 13, so that the antislip device 1 will always be ready for operation even should the deceleration detector 18 respond repeatedly at consecutive brief intervals.

I claim:
1. An antislip device for a compressed air brake, comprising a double-seated valve having a valve member, a cylinder, a piston connected to said valve member dividing said cylinder into a first chamber and a second chamber, a deceleration detector communicating with said first chamber, said second chamber being in communication with said first chamber through a throttling constriction, a telescopic valve for exhausting said second chamber connected to said piston, and the length of the stroke of said telescopic valve being less than the length of the stroke of said valve member.

2. An antislip device according to claim 1, in which said two chambers are connected by a check valve responsive to excess pressure in said first chamber.

3. An antislip device according to claim 1 in which said telescopic valve comprises an outer guide member, a valve element in said guide member, a spring connecting said valve element to said guide member, a tube in communication with the atmosphere having an end formed as a valve seat and said spring biasing said valve element into contact with said valve seat.

4. An antislip device according to claim 3 in which said piston is connected to said guide member so that movement of said piston results in a movement of said valve element relative to said valve seat and air may flow to the atmosphere through said tube.

References Cited
UNITED STATES PATENTS 2,398,907  4/1946  McCune _____ 303—24
3,414,336  12/1968  Atkin et al. _____ 303—21F MILTON BUCHLER, Primary Examiner J. J. McLAUGHLIN, Assistant Examiner U.S. Cl. X.R.

188—181A; 303—21F